United States Patent
Miyazaki (10) Patent No.: US 7,308,211 B2
(45) Date of Patent: Dec. 11, 2007

(54) OPTICAL RECEIVER AND METHOD FOR CONTROLLING DISPERSION COMPENSATION

(75) Inventor: Tetsuya Miyazaki, Tokyo (JP)

(73) Assignee: Communications Research Laboratory, Independent Administrative Institution, Tokyo (JP)

( * ) Notice: Subject to any disclaimer, the term of this patent is extended or adjusted under 35 U.S.C. 154(b) by 664 days.

(21) Appl. No.: 10/726,330

(22) Filed: Dec. 2, 2003

(65) Prior Publication Data

US 2004/0179849 A1 Sep. 16, 2004

(30) Foreign Application Priority Data

Mar. 14, 2003 (JP) .............................. 2003-070418

(51) Int. Cl.
  *H04B 10/06* (2006.01)
  *H04B 10/14* (2006.01)
  *H04B 10/18* (2006.01)
(52) U.S. Cl. ...................... 398/208; 398/147; 398/159; 398/209
(58) Field of Classification Search .................... None
See application file for complete search history.

(56) References Cited

U.S. PATENT DOCUMENTS

| | | | |
|---|---|---|---|
| 5,999,289 A | 12/1999 | Ihara et al. |
| 6,301,048 B1 | 10/2001 | Cao |
| 6,310,993 B1 | 10/2001 | Cao et al. |
| 6,330,383 B1 | 12/2001 | Cai et al. |
| 6,363,184 B2 | 3/2002 | Cao |
| 6,370,300 B1 | 4/2002 | Eggleton et al. |
| 6,430,347 B1 | 8/2002 | Cain et al. |
| 6,445,864 B2 | 9/2002 | Jiang et al. |
| 6,453,093 B2 | 9/2002 | Xie et al. |
| 6,490,398 B2 | 12/2002 | Gruner-Nielsen et al. |

(Continued)

FOREIGN PATENT DOCUMENTS

JP 2002-208892 7/2002

(Continued)

OTHER PUBLICATIONS

Kikuchi, K. "Highly sensitive interferometric autocorrelator in the optical communication band using Si avalanche photodiode as two-photon absorber." Optical Fiber Communication Conference and Exhibit, 1998. OFC '98., Technical Digest. Feb. 22-27, 1998: 313-314.*

(Continued)

*Primary Examiner*—David S Kim
(74) *Attorney, Agent, or Firm*—Christie, Parker & Hale, LLP (57) ABSTRACT

An optical receiver including an optical divider to divide a signal light from an optical transmission line into two portions, a first and a second dispersion compensators, each dispersion compensator having variable dispersion compensation to compensate chromatic dispersions of each of the two portions of signal light output from the optical divider, and a data demodulator to demodulate a data carried by a signal light output from the first dispersion compensator. The optical receiver further includes an optical autocorrelator to operate on a signal light output from the second dispersion compensator and a controller to control the second dispersion compensator to increase autocorrelation of the optical autocorrelator, and to control the first dispersion compensator according to the result of said controlling the second dispersion compensator.

12 Claims, 7 Drawing Sheets

U.S. PATENT DOCUMENTS

| | | | |
|---|---|---|---|
| 6,496,615 B2 | 12/2002 | Okuno | |
| 6,580,855 B1* | 6/2003 | Vohra et al. | 385/37 |
| 6,889,347 B1* | 5/2005 | Adams et al. | 714/704 |
| 6,956,917 B2* | 10/2005 | Lenosky | 375/350 |
| 7,024,111 B2* | 4/2006 | Knox et al. | 398/25 |
| 7,088,925 B1* | 8/2006 | Noe | 398/147 |
| 2001/0009467 A1 | 7/2001 | Fujita | |
| 2001/0046077 A1 | 11/2001 | Akiyama et al. | |
| 2002/0176129 A1* | 11/2002 | Dinu et al. | 359/110 |
| 2003/0072532 A1* | 4/2003 | Giannone et al. | 385/37 |
| 2007/0031153 A1* | 2/2007 | Aronson et al. | 398/138 |

FOREIGN PATENT DOCUMENTS

| | | |
|---|---|---|
| JP | 2003-32194 | 1/2003 |
| WO | WO 0193465 A1 * | 12/2001 |

OTHER PUBLICATIONS

Ludwig, R. et al. "Unrepeatered 160 Gbit/s RZ single-channel transmission over 160 km of standard fibre at 1.55 μm with hybrid MZI optical demultiplexer." Electronics Letters, vol. 36, No. 16, Aug. 3, 2000: 1405-1406.*

Taira, K. et al. "Background-free intensity autocorrelator employing si avalanche photodiode as two-photon absorber." Electronics Letters, vol. 38, No.23, Nov. 7, 2002: 1465-1466.*

Wielandy, S. et al. "Real-time measurement of accumulated chromatic dispersion for automatic dispersion compensation." Electronics Letters, vol. 38, No. 20, Sep. 26, 2002: 1198-1199.*

Madsen, C.K. "Integrated waveguide allpass filter tunable dispersion compensators." Optical Fiber Communication Conference and Exhibit, 2002. OFC 2002. Mar. 17-22, 2002: 131-132.*

Yokoyama, Y. et al., "Precise dispersion monitoring and dynamic compensation in 42.7-Gb/s long-haul transmission using an optical time domain level monitoring technique", Networking Research Laboratories, NEC Corporation, 2 pages, Aug. 2003.

Takushima, Yuichi, et al., "Experimental Demonstration of In-Service Dispersion Monitoring in 960-km WDM Transmission System Using Optical Frequency-Modulation Method", IEEE Photonics Technology Letters, vol. 15, No. 6, Jun. 2003, pp. 870-872.

H. Ooi, et al., "40-Gbit/s WDM Automatic Dispersion Compensation with Virtually Imaged Phased Array (VIPA) Variable Dispersion Compensators" IEICE Trans. Commun., vol. E85-B, No. 2, Feb. 2002, pp. 463-469.

T. Miyazaki, et al., "Synchronous Optical Demultiplexing and Sampling of 80-Gb/s OTDM Signals by Optically Recovered Clock Using Mode-Locked Laser Diode and Symmetric Mach-Zehnder Switch" IEEE Photonics Technology Letters, vol. 14. No. 12, Dec. 2002, pp. 1734-1736.

* cited by examiner

OPTICAL RECEIVER AND METHOD FOR CONTROLLING DISPERSION COMPENSATION

CROSS REFERENCE TO RELATED APPLICATIONS

This application claims priority to Japanese Patent Application No. 2003-070418, filed Mar. 14, 2003, the entire contents of which are incorporated herein by reference.

FIELD OF THE INVENTION

This invention relates to an optical receiver and method for controlling dispersion compensation.

BACKGROUND OF THE INVENTION

In a long haul high speed optical transmission system, especially in an optical transmission line for transmitting a signal light of multiple wavelengths through wavelength division multiplexing, it is required to compensate chromatic dispersion and, if necessary, dispersion slope. For instance, optical transmission systems for compensating dispersion and dispersion slope and compensators thereof are described in the following issued patents:
U.S. Pat. No. 6,496,615,
U.S. Pat. No. 6,490,398,
U.S. Pat. No. 6,453,093,
U.S. Pat. No. 6,445,864,
U.S. Pat. No. 6,430,347,
U.S. Pat. No. 6,363,184,
U.S. Pat. No. 6,310,993, and
U.S. Pat. No. 6,301,048.

The more an optical pulse width becomes short, the more a signal spectrum widens. Accordingly, in ultra high speed optical pulse transmission systems in which a bit rate per wavelength becomes 160 Gb/s or more, the influence by chromatic dispersion including high-order dispersion in optional fiber transmission line becomes serious.

In a WDM (wavelength division multiplexing) optical transmission system in which a bit rate per wavelength is 10 Gb/s to 40 Gb/s, dispersion management for periodically compensating accumulated dispersion and dispersion slope in an optical fiber transmission line and post dispersion compensation for compensating residual chromatic dispersion at the end of the optical transmission line are used together.

The more a bit rate becomes high, the more dispersion tolerance becomes narrow. In ultra high-speed optical pulse transmission systems in which a bit rate per wavelength is 160 Gb/s or more, it is difficult to realize proper dispersion compensation using a dispersion compensating device of a fixed amount of dispersion compensation. Furthermore, chromatic dispersion in an optical fiber varies with time due to a temperature variation etc. In recent optical networks, optical signal paths are switched according to a demand and whether a fault exists. To keep up with those operations, adaptable automatic dispersion control is indispensable.

As a conventional dispersion control method, a method has been proposed in which a part of the transmission signal light is branched and converted into electrical signal, the intensity of signal clock component is monitored, and a variable dispersion controller is negative-feedback-controlled so that the intensity becomes the maximum. Such method is described, for example, in H. Ooi, T. Takahara, G. Ishikawa, S. Wakana, Y. Kawahata, H. Isono, and N. Nitamura, "40-Gbit/s WDM automatic dispersion compensation with virtually imaged phased array (VIPA) variable dispersion compensators", IEICE Trans. Commun. Vol. E85-B, No. 2, pp. 463-469, 2002. A configuration to automatically control a amount of dispersion compensation of a dispersion compensator on a receiving end of an optical signal is described in the U.S. Pat. No. 6,370,300.

A dispersion compensator capable of controlling its amount of dispersion compensation is described in the U.S. Pat. Nos. 6,330,383 and 6,301,048.

In an optical transmission system of an optical duo-binary modulation method, a configuration to control a dispersion value of a dispersion compensator according to intensity of a specific frequency component of an optical signal is described in the US Patent Application Publication No. 2001/46077.

A configuration to detect whether an amount of dispersion compensation in an optical fiber transmission line stays within a predetermined range and to control the amount of dispersion compensation according to the detected result is described in the US Patent Application Publication No. 2001/9467.

Methods to detect and compensate waveform deterioration due to chromatic dispersion in an optical fiber transmission line are described in the U.S. Pat. No. 5,999,289.

In a conventional configuration, a clock frequency is limited to bit rates of 40-80 Gb/s or less which can be photoelectrically converted. If its bit rate is 160 Gb/s or more, it is impossible to monitor a signal quality by directly converting an optical signal into an electric signal. In a method to monitor a quality of received signal in the electric stage and to control its chromatic dispersion, it is necessary to pulse-demultiplex (DEMUX) a signal of 160 Gb/s into tributary signals of 40 Gb/s or less. However, generally, a system to monitor quality of a signal of 10 Gb/s or more requires an expensive electronic circuit and the monitored results includes deterioration of signal quality due to the DEMUX. When the deterioration of signal quality between tributary channels is varied, it sometimes causes wrong operation of dispersion control.

Even in a single wavelength transmission, ultra high speed transmission of 160 Gb/s needs to compensate dispersion slope because expansion of signal spectrum cannot be neglected.

SUMMARY OF THE INVENTION

In one embodiment of the invention, an optical autocorrelator for operating autocorrelation of a signal light is disposed to control a dispersion compensator for compensating chromatic dispersion of a signal light so that the autocorrelation becomes larger, preferably maximum. In the invention, a transmission error rate information calculator for calculating information of transmission error rate of an optical transmission line out of a dispersion compensated signal light is also disposed to control the dispersion compensator so that the transmission error rate becomes smaller, preferably minimum.

With the above configuration, a dispersion compensator is properly controlled even in an ultra high speed optical transmission of 160 Gb/s or more.

Preferably, the dispersion compensator is controlled so as to increase the autocorrelation first and then controlled to decrease the transmission error rate.

Preferably, the dispersion compensator comprises a dispersion/dispersion slope compensator having variable amount of dispersion compensation and variable dispersion slope. The amount of dispersion compensation of the dispersion/dispersion slope compensator is controlled so that the autocorrelation becomes larger, and the dispersion slope of the dispersion/dispersion slope compensator is controlled so that the transmission error rate becomes smaller.

In one embodiment, a second dispersion compensator is disposed separately from a first dispersion compensator on a main track to determine an appropriate amount of dispersion compensation. The autocorrelation of a signal light output from the second dispersion compensator is operated and the second dispersion compensator is controlled on trial so that the autocorrelation becomes larger. The first dispersion compensator is controlled according to the trial result.

Preferably, the first dispersion compensator comprises a dispersion/dispersion slope compensator having variable amount of dispersion compensation and variable dispersion slope. The dispersion slope of the dispersion/dispersion slope compensator is controlled so that the transmission error rate of the optical transmission line obtained from the output signal light from the first dispersion compensator becomes smaller.

Furthermore, in one embodiment, a second dispersion compensator is disposed separately from a first dispersion compensator on the main track to determine an appropriate amount of dispersion compensation. The autocorrelation of a signal light output from the second dispersion compensator is operated and the second dispersion compensator is controlled on trial so that the autocorrelation becomes larger. The first dispersion compensator is initialized according to the trial result. Then, an autocorrelation of a signal light output from the first dispersion compensator is operated and the first dispersion compensator is controlled so that the autocorrelation becomes larger and a transmission error rate of the optical transmission line obtained from the signal light output from the first dispersion compensator becomes smaller.

Preferably, the first dispersion compensator comprises a dispersion/dispersion slope compensator having variable amount of dispersion compensation and variable dispersion slope. The dispersion slope of the dispersion/dispersion slope compensator is controlled so that a transmission error rate of the optical transmission line obtained from the signal light output from the first dispersion compensator becomes smaller.

BRIEF DESCRIPTION OF THE DRAWINGS

The above and other objects, features and advantages of the present invention will be apparent from the following detailed description of explanatory embodiments of the invention in conjunction with the accompanying drawings, in which.

DETAILED DESCRIPTION

Explanatory embodiments of the invention are explained below in detail with reference to the drawings.

Figure 1:
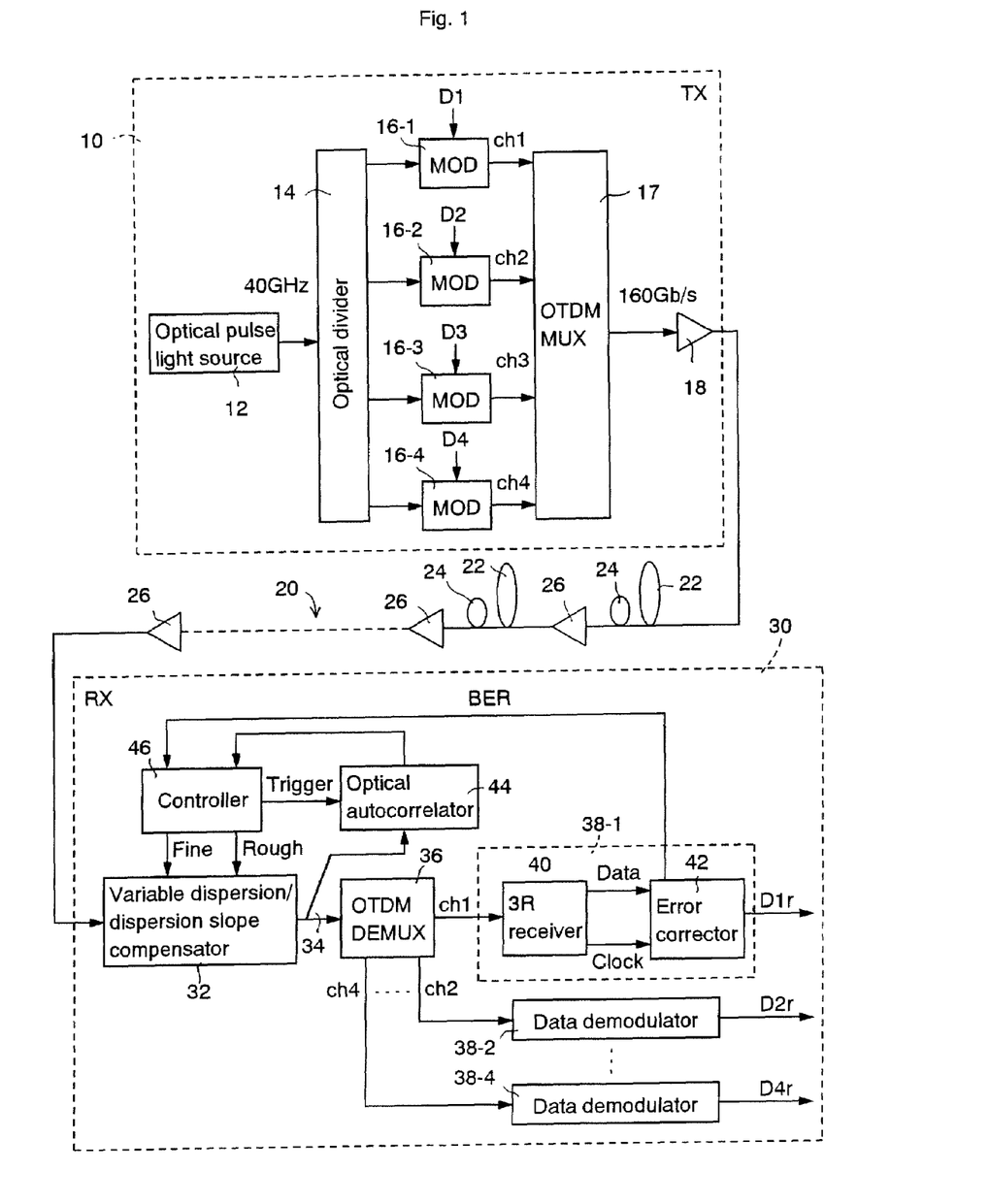
FIG. 1 is a schematic block diagram of an explanatory embodiment according to the invention.

FIG. 1 shows a schematic block diagram of an explanatory embodiment according to the invention. A system of this explanatory embodiment comprises an optical transmitter 10, a dispersion compensating optical transmission line 20, and an optical receiver 30.

The configuration and operation of the optical transmitter 10 is explained below. A pulse light source 12 outputs a pulse train of single wavelength λs. Here, it is assumed as an example, that the pulse light source 12 outputs an optical pulse train of 40 GHz. An optical divider 14 divides the output pulse from the pulse light source 12 into four portions and applies them to data modulators 16-1 to 16-4 respectively. The data modulator 16-1 binary-modulates amplitude of the optical pulse train from the optical divider 14 according to a data D1. Similarly, the modulators 16-2 to 16-4 binary-modulate amplitudes of the optical pulse trains from the optical divider 14 according to data D2 to D4, respectively. With this operation, the data modulators 16-1 to 16-4 output optical signals of 40 Gb/s to carry the data D1 to D4, respectively. An optical time division multiplexing (OTDM) multiplexer 17 time-division-multiplexes the optical pulse signals from the data modulators 16-1 to 16-4, namely multiplexes each optical signal at a different time slot. A data rate of an output signal light from the OTDM multiplexer 17 becomes 160 Gb/s. An optical amplifier 18 optically amplifies the output signal light from the OTDM multiplexer 17 and outputs it for the optical transmission line 20.

In the optical transmission line 20, optical transmission fibers 22, dispersion compensating fibers (DCF) 24, and optical amplifiers 26 are dispersively disposed. The DCFs 24 with different amounts of dispersion compensation may be disposed in the optical transmission line 20. Because such optical transmission lines comprising the DCF 24 and optical amplifier 26 are well known in the art, further explanations are omitted.

The configuration and operation of the optical receiver 30 are explained below. The signal light propagated in the optical transmission line 20 enters the variable dispersion/dispersion slope compensator 32 whose chromatic dispersion and chromatic dispersion slope are adjustable. The details of the variable dispersion/dispersion slope compensator 32 are described later.

A divider 34 divides the output light from the variable dispersion/dispersion slope compensator 32 into two portions and supplies one portion to an OTDM synchronous optical demultiplexer 36 and the other to an optical autocorrelator 44. The synchronous optical demultiplexer 36 extracts clocks out of the output light from the divider 34, demultiplexes input light into four channels of ch1 to ch4 in synchronization with the clock, and supplies the demultiplexed channels to data demodulators 38-1 to 38-4 respectively.

As described in, for example, T. Miyazaki et al, IEEE Photonics Technology Letters, Vol. 14, No. 12, the synchronous optical demultiplexer 36 having such purpose is realized by combining an injection locking semiconductor mode-locked laser and a symmetrical Mach-Zehnder optical switch. An input light of 160 Gb/s is input to the injection locking mode-locked laser which pulse-oscillates at 40 GHz. With this operation, the injection locking mode-locked laser outputs an optical clock of 40 GHz synchronized with the input light of 160 Gb/s. The input light of 160 Gb/s and optical clock of 40 GHz from the injection locking mode-locked laser enter the symmetrical Mach-Zehnder optical switch. By operating this way, one channel of 40 Gb/s can be demultiplexed. A plurality of the symmetrical Mach-Zehnder optical switches may be provided, the number being equal to the number of channels desired to be demultiplexed.

The data demodulator 38-1 comprises a 3R receiver 40 and an error corrector 42. The signal light of ch1 demultiplexed by the demultiplexer 36 enters the 3R receiver 40 of the data demodulator 38-1. The 3R receiver 40 comprises a photodetector to convert the signal light of ch1 from the demultiplexer 36 into an electric signal and an electric circuit to restore (retime, reshape and regenerate) the electric signal from the photodetector with 3R and to extract the clock. The 3R receiver 40 restores the data carried by the signal light of ch1 and its clock. The 3R receiver 40 in this embodiment is sufficient if it is capable of the use for 40 Gb/s. The data signal and clock restored by the 3R receiver 40 enter the error corrector 42. The error corrector 42 corrects errors using an error detecting and correcting code contained in the data signal according to the data signal and clock from the 3R receiver 40 and outputs a reception data D1$r$. When the error correcting operation functions effectively, the reception data D1$r$ equals to the data D1 in the optical transmitter 10. The error corrector 42 also supplies the error rate information of the reception data to a controller 46.

Similar to the data demodulator 38-1, each of the data demodulators 38-2 to 38-4 comprises a 3R receiver and an error corrector. However, it is not necessary to supply the error rate information detected by the error correctors of the data demodulators 38-2 to 38-4 to the controller 46.

Figure 2:
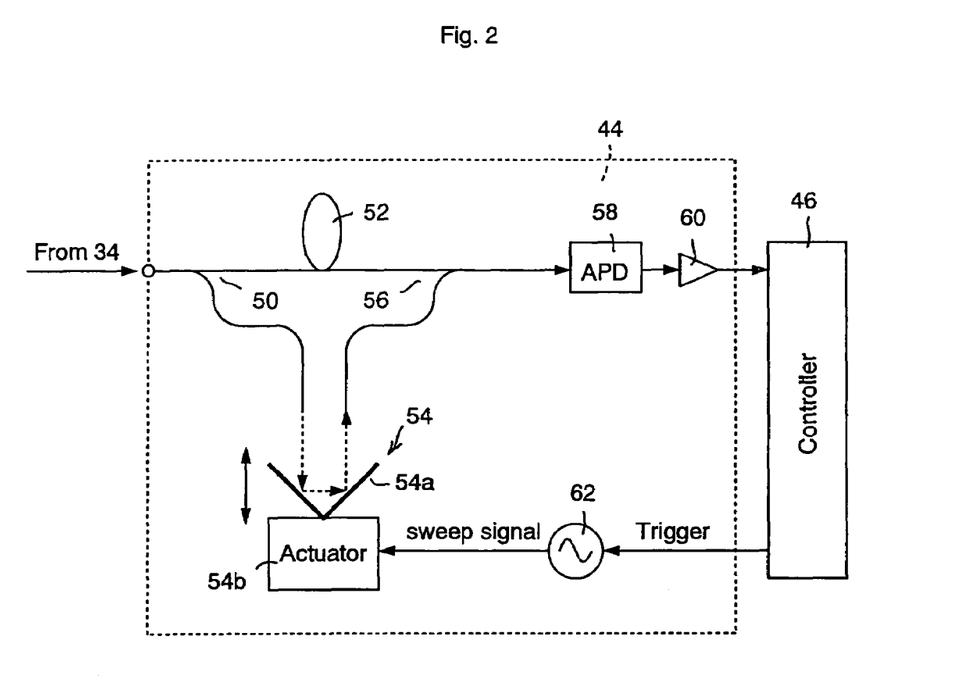
FIG. 2 is a schematic block diagram of an optical autocorrelator 44.

FIG. 2 shows a schematic block diagram of an optical autocorrelator 44. The divider 50 divides the input light (one of the outputs from the divider 34) into two portions and applies one portion to a fixed delay 52 and the other to a variable delay 54. The variable delay 54 comprises a mirror 54$a$ capable of moving in the direction of optical axis and an actuator 54$b$ to move the mirror 54$a$ in the direction of optical axis. A combiner 56 combines the output light from the fixed delay 52 and the output light from the variable delay 54. The combined light from the combiner 56 is applied to a two-photon absorption avalanche photodiode (APD) 58 and converted into an electrical signal by the APD 58. A preamplifier 60 amplifies the output from the APD 58 to supply to the controller 46. A sweep signal source 62 generates a sweep signal for functioning as a driving signal for the actuator 54$b$ according to the trigger signal from the controller 46. The actuator 54$b$ moves the mirror 54$a$ back and forth in the direction of optical axis according to the sweep signal from the sweep signal source 62. With this operation, the delay time of the variable delay 54 is swept in a certain range.

Figure 3:
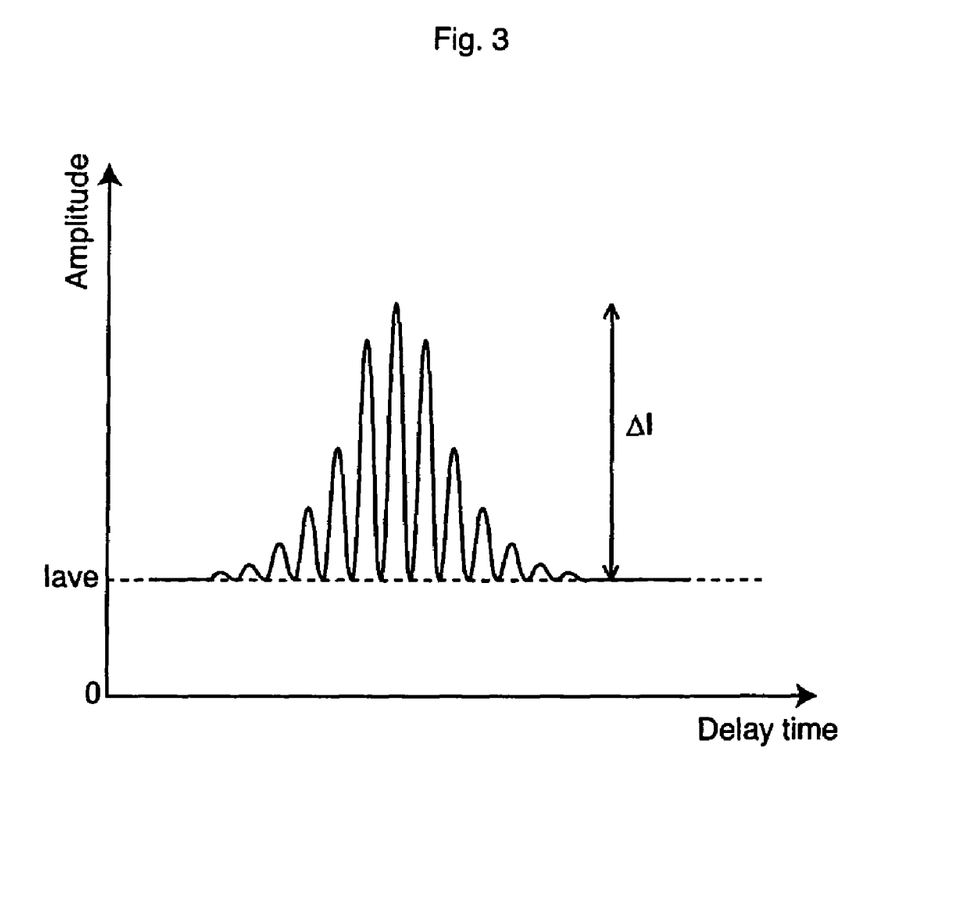
FIG. 3 shows a variation example of output from an amplifier 60 relative to delay time.

FIG. 3 shows a variation example of the output from the amplifier 60 relative to the delay time of the variable delay 54. The output amplitude of the amplifier 60 periodically varies relative to the delay time of the variable delay 54. When the correlation becomes strongest, the output amplitude of the amplifier 60 becomes the maximum. When the output of the amplifier 60 reaches the maximum, the amount of increase from the bias Iave is expressed as ΔI, and the more the waveform deterioration decreases, the more the contrast ΔI/Iave relative to the bias Iave increases. Therefore, an amount of dispersion compensation should be controlled in the direction to increase the contrast ΔI/Iave.

Instead of the two-photon absorption APD 58, a second harmonic generation (SHG) crystal and an APD are applicable. In this case, two optical waves are input to the SHG crystal at a slight angle. The SHG crystal generates a light of a frequency corresponding to a product of the two input light waves. The optical wave generated by the SHG crystal enters the APD. An output from the APD represents the correlation of the two optical waves entered the SHG crystal. In this case, Iave becomes zero or very small and thus amplitude ΔI of the alternating component represents a degree of autocorrelation.

The controller 46 measures the maximum variation value ΔI of the alternating component included in the output from the amplifier 60, specifically the contrast ratio ΔI/Iave, for one sweep by the sweep signal source 62 and stores it as an index of autocorrelation. Then, the controller 46 controls the amount of dispersion compensation or the amount of dispersion compensation and dispersion slope of the variable/dispersion slope compensator 32 to increase the contrast ratio.

The controller 46 also controls the amount of dispersion compensation or the amount of dispersion compensation and dispersion slope of the variable/dispersion slope compensator 32 to make its error rate minimum according to the transmission error rate (BER) from the error corrector 42 in the ch1 data demodulator 38-1.

The controller 46 roughly controls the variable dispersion/dispersion slope compensator 32 so that the autocorrelation of the received signal light becomes maximum and finely controls the variable dispersion/dispersion slope compensator 32 so that the BER of the received signal becomes minimum. For example, when the BER of the received signal reaches to a predetermined value (e.g. $10^{-5}$) or more, the control (rough-control) of the variable dispersion/dispersion slope compensator 32 is launched.

Figure 4:
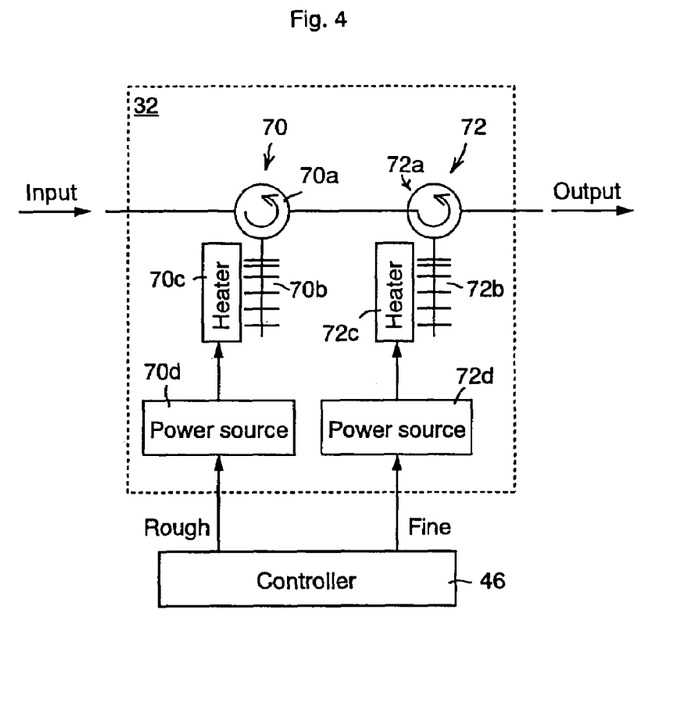
FIG. 4 is a schematic diagram of a configuration example of a variable dispersion/dispersion slope compensator 32.

FIG. 4 shows a schematic diagram of the variable dispersion/dispersion slope compensator 32. In FIG. 4, a dispersion compensator 70 for compensating chromatic dispersion and a dispersion slope compensator 72 for compensating dispersion slope are connected in serial.

The dispersion compensator 70 comprises an optical circulator 70$a$, fiber grating 70$b$, a heater 70$c$ for heating the fiber grating 70$b$, and a power supply 70$d$ for supplying electric current to the heater 70$c$. The optical circulator 70$a$ supplies the input light of the apparatus 32 to the fiber grating 70$b$ and transfers the light reflected by the fiber grating 70$b$ to the dispersion slope compensator 72. The power supply 70$d$ supplies the electric current which amount is determined according to the rough-control signal from the controller 46 to the heater 70$c$, and the heater 70$c$ heats the fiber grating 70$b$. With this operation, the chromatic dispersion characteristics of the fiber grating 70$b$ are varied. The dispersion compensator of this type, in which an amount of dispersion compensation is adjustable by heating the fiber grating, is well known. The fiber grating 70$b$ is designed capable of giving an amount of dispersion compensation of desired range at a signal wavelength λs.

The configuration of the dispersion slope compensator 72 is basically identical to that of the dispersion compensator 70. That is, the dispersion slope compensator 72 comprises an optical circulator 72$a$, fiber grating 72$b$, a heater 72$c$ for heating the fiber grating 72$b$, and a power supply 72$d$ for supplying electric current to the heater 72$c$. The optical circulator 72$a$ supplies the input light from the optical circulator 70a of the dispersion compensator 70 to the fiber grating 72b and transfers the light reflected by the fiber grating 72b to the outside. The power supply 72d supplies the electric current. The amount of the current is determined according to the fine-control signal from the controller 46 to the heater 72c, and the heater 72c heats the fiber grating 72b. With this operation, the inclination of chromatic dispersion (dispersion slope) of the fiber grating 72b are varied setting the wavelength λs in the center. The fiber grating 72b is designed capable of varying the inclination of chromatic dispersion within a desired range setting the signal wavelength λs in the center.

It is possible to substitute the two optical circulators 72a and 70a with a single optical circulator having four ports.

As a dispersion slope compensator, there is a configuration comprising two fiber gratings, each having dispersion slope of opposite sign and keeping a constant chromatic dispersion at a subject wavelength by controlling the two fiber gratings separately. A dispersion slope compensator in such configuration can be used as the dispersion slope compensator 72.

Furthermore, even in a case using a single fiber grating, it is possible to control the chromatic dispersion and the dispersion slope individually by finely controlling a temperature distribution. A variable dispersion/dispersion slope compensator of such configuration can be used as the variable dispersion/dispersion slope compensator 32 in this embodiment.

Figure 5:
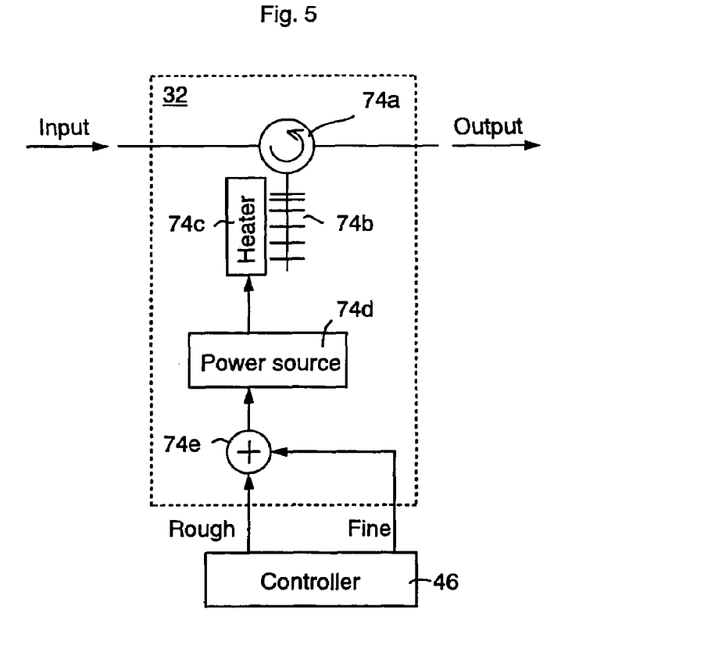
FIG. 5 is a schematic diagram of another configuration example of a variable dispersion/dispersion slope compensator 32.

FIG. 5 shows another schematic diagram of the variable dispersion/dispersion slope compensator 32. In the example shown in FIG. 5, a single fiber grating compensates both chromatic dispersion and dispersion slope. In FIG. 5, the variable dispersion/dispersion slope compensator 32 comprises an optical circulator 74a, a fiber grating 74b, a heater 74c for heating the fiber grating 74b, a power supply 74d for supplying electric current to the heater 74c, and an adder 74e for adding a rough-control signal and a fine-control signal from the controller 46 and applying the added result to the power supply 74d.

The optical circulator 74a supplies the input light of the apparatus 32 to the fiber grating 74b and outputs the light reflected by the fiber grating 74b to the outside of the apparatus 32. The adder 74e adds the rough-control signal and the fine-control signal from the controller 46 and applies the added result to the power supply 74d. The power supply 74d supplies the electric current the amount of which corresponds to the amount of output from the adder 74e to the heater 74c, and the heater 74c heats the fiber grating 74b. With this operation, the chromatic dispersion characteristics and dispersion slope of the fiber grating 74b are varied. The fiber grating 74b is designed so as to give an amount of dispersion compensation in a desired range at the signal wavelength λs and to vary the dispersion slope in a desired range at the wavelength λs.

In the configuration shown in FIG. 4, although two optical circulators and two fiber gratings are required, it is possible to finely control them because the dispersion compensation and dispersion slope compensation can be independently set.

Although the dispersion/dispersion slope compensation control (rough-control) by autocorrelation and the dispersion/dispersion slope compensation control (fine-control) by BER can be performed at the same time, there is a possibility that the dispersion/dispersion slope compensation is not controlled in a preferable condition, if both dispersion/dispersion slope compensation are performed unrelated. Therefore, it is preferable to perform the dispersion/dispersion slope compensation control (rough-control) by autocorrelation first and then the dispersion/dispersion slope compensation control (fine-control) by BER. When the BER is seriously deteriorated, the dispersion/dispersion slope compensation control (rough-control) by autocorrelation should be retried.

Figure 6:
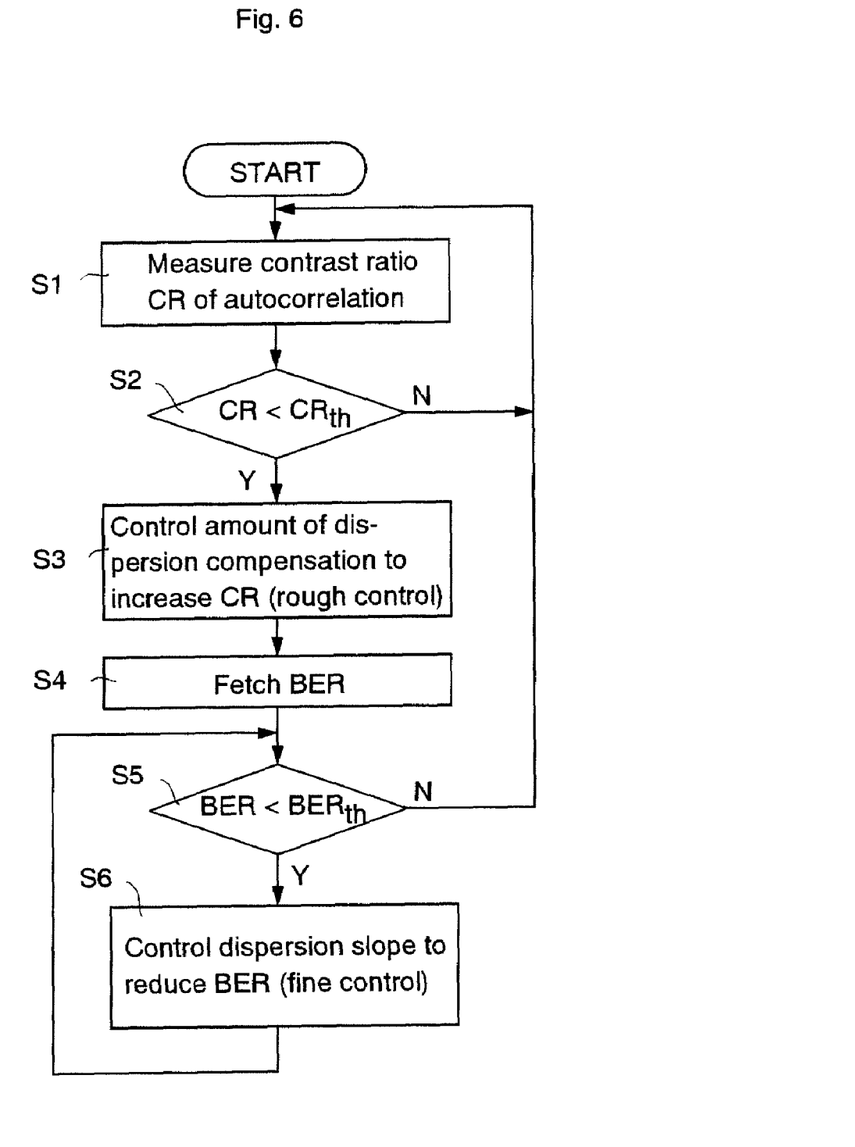
FIG. 6 shows a flow chart of an example of dispersion compensation control for an autocorrelation value and a BER.

FIG. 6 shows a flow chart of dispersion compensation control of the variable dispersion/dispersion slope compensator 32 shown in FIG. 4. The controller 46 first measures autocorrelation (here, the contrast ratio CR) of the light output from the variable dispersion/dispersion slope compensator 32 using an optical autocorrelator 44 (S1). When the measured contrast ratio CR becomes the threshold $CR_{th}$ or more (S2), return to the step S1 since there is no need to control the amount of compensation of the variable dispersion/dispersion slope compensator 32.

When the measured contrast ratio CR is smaller than the threshold $CR_{th}$ (S2), the amount of dispersion compensation of the variable dispersion/dispersion slope compensator 32 is controlled in such manner that the contrast ratio CR becomes larger (S3). For instance, by varying the amount of dispersion compensation of the variable dispersion/dispersion slope compensator 32 step by step, the contrast ratio of each variation is measured. By comparing contrast ratios of two points, a variation direction of the amount of dispersion compensation to increase the contrast ratio can be found. Further, by comparing contrast ratios of three points, it is possible to find out whether the contrast ratio has reached the maximum. Accordingly, by comparing the contrast ratios of two, preferably three, points, the amount of dispersion compensation of the variable dispersion/dispersion slope compensator 32 is slightly varied in such direction that the contrast ratio increases. By repeating the above operation, the amount of dispersion compensation of the variable dispersion/dispersion slope compensator 32 can be controlled to the point where the contrast ratio becomes maximum.

After that, the controller 46 fetches the transmission error rate (BER) output from the error corrector (S4). When the BER is not small enough to perform the fine control (S5), namely when the BER is not smaller than $BER_{th}$ ($\sim 10^{-5}$), return to the step S1 and retry the dispersion control (rough control) by autocorrelation.

When the BER is smaller than $BER_{th}$ (S5), the dispersion slope compensation of the variable dispersion/dispersion slope compensator 32 is controlled so as to make the BER smaller (S6). For example, by varying the dispersion slope of the variable dispersion/dispersion slope compensator 32 step by step setting the wavelength λs in the center, a BER of each variation is measured. By comparing BERs of two points, the change direction of the dispersion slope to decrease the BER can be found. By comparing BERs of three points, it is possible to find out whether the BER has reached its maximum. Accordingly, by comparing the BERs of two, preferably three, points, the dispersion slope of the variable dispersion/dispersion slope compensator 32 is slightly varied in such direction that the BER becomes smaller. By repeating the above operation, the dispersion slope of the variable dispersion/dispersion slope compensator 32 can be controlled to the point where the BER becomes minimum.

When the BER becomes the $BER_{th}$ or more while the control for the variable dispersion/dispersion slope compensator 32 using the BER is performed (S5), return to the step S1 and retry the dispersion control (rough control) by the autocorrelation.

In FIG. 6, although the threshold for starting the dispersion control by the BER and the threshold for stopping the dispersion control by the BER are both set to the same value of ($10^{-5}$), it is understood that each threshold can be set to an appropriate value.

In the first explanatory embodiment, the dispersion/dispersion slope for the signal light used for demodulating data is controlled, and the control hinders the data demodulation. For instance, performing in-service operation becomes difficult, or errors which cannot be corrected remain.

Figure 7:
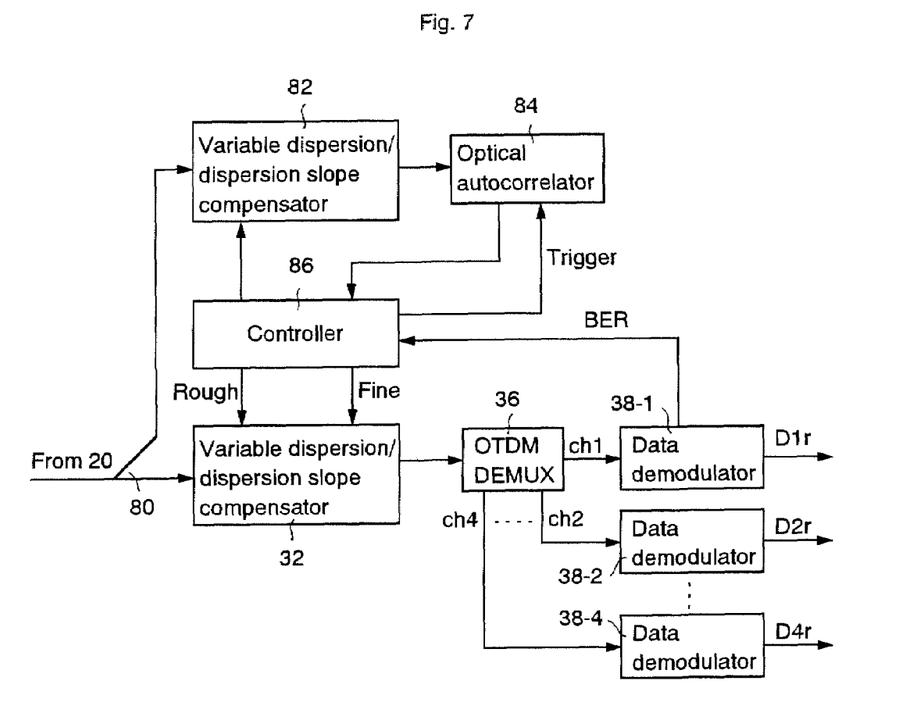
FIG. 7 is a schematic block diagram of a modified example of the optical receiver.

Accordingly, as a second explanatory embodiment, a variable dispersion/dispersion slope compensator is disposed for performing dispersion control according to the autocorrelation and BER. FIG. 7 shows a schematic diagram of such an explanatory embodiment of an optical receiver. The elements identical to those in FIG. 1 are labeled with the same reference numbers.

An optical divider 80 divides a light input from the optical transmission line 20 into two portions and supplies one portion to the variable dispersion/dispersion slope compensator 32 and the other to a second variable dispersion/dispersion slope compensator 82. The variable dispersion/dispersion slope compensator 82 comprises the same input/output characteristics, namely the same dispersion/dispersion slope compensating characteristics as those of the variable dispersion/dispersion slope compensator 32. An optical autocorrelator 84 processes the autocorrelation of the output light from the variable dispersion/dispersion slope compensator 82. The inside configuration of the optical autocorrelator 84 is identical to that of the optical autocorrelator 44 shown in FIG. 1. The correlation result from the optical autocorrelator 84 and a transmission error rate BER from the data demodulator 38-1 are applied to a controller 86.

The controller 86 first tries dispersion control for the received signal so that the autocorrelation becomes optimum, using the variable dispersion/dispersion slope compensator 82 and optical autocorrelator 84 separately from the variable dispersion/dispersion slope compensator 32 used for the dispersion/dispersion slope compensation of the received signal light. The controller 86 then roughly adjusts the amount of dispersion compensation of the variable dispersion/dispersion slope compensator 32 according to the first tried dispersion control. The controller 86 further finely adjusts the dispersion slope of the variable dispersion/dispersion slope compensator 32 according to the BER from the data demodulator 38-1.

In the embodiment shown in FIG. 7, an amount of dispersion compensation to make the autocorrelation maximum can be determined without affecting the reception of signal lights. Accordingly, receiving of the data D1 to D4 becomes stable and, even data transmission service is in-service, it is possible to search a more preferable amount of dispersion compensation and to swiftly control the dispersion compensation of the variable dispersion/dispersion slope compensator 32 to a preferable amount.

In the configuration shown in FIG. 7, a transmission error rate of the output signal from the variable dispersion/dispersion slope compensator 82 is unknown and thus it is not possible to perform control of the variable dispersion/dispersion slope compensator 82 according to the BER. However, by adding the means for measuring the BER of the output signal from the variable dispersion/dispersion slope compensator 82 and applying the measured BER to the controller 86, the controller 86 can perform dispersion slope control of the variable dispersion/dispersion slope compensator 82 relative to the BER as well. In this case, the controller 86 controls the variable dispersion/dispersion slope compensator 32 to the preferable amount of dispersion compensation and the preferable amount of dispersion slope compensating amount having been obtained by the first tried dispersion control.

Figure 8:
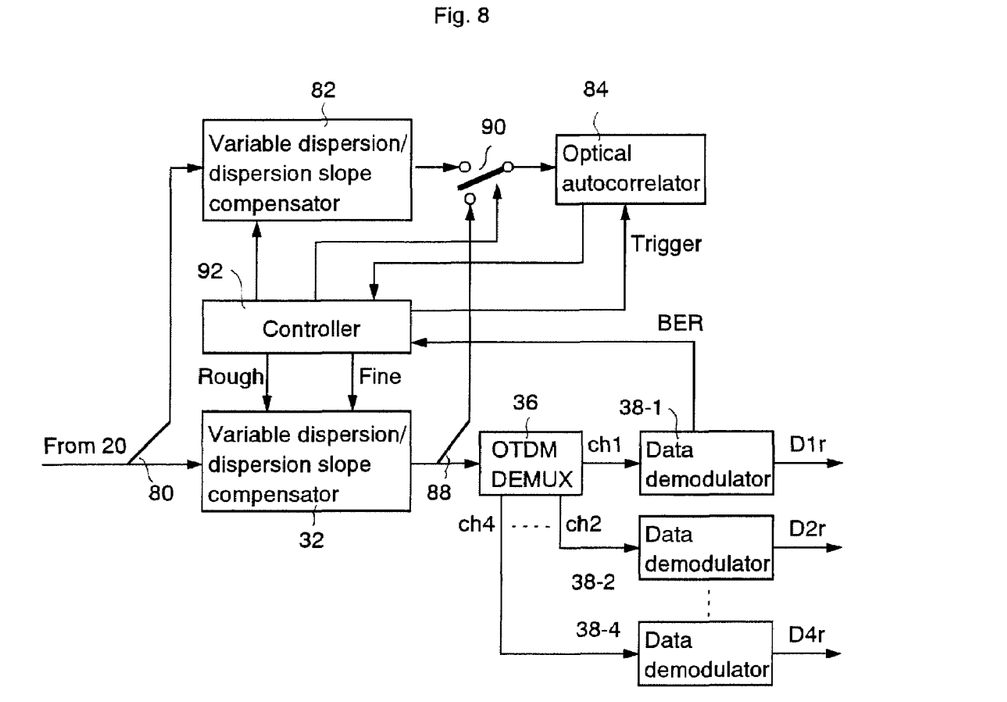
FIG. 8 is a schematic block diagram of another modified example of the optical receiver.

Even if a same dispersion medium, e.g. a fiber grating, is used for each of the variable dispersion/dispersion slope compensators 32 and 82, individual differences inevitably appear. FIG. 8 shows a schematic clock diagram of an explanatory embodiment of an optical receiver capable of absorbing such individual differences. The same elements shown in FIG. 7 are labeled with identical reference numerals in FIG. 8.

An optical divider 88 divides the output light from the variable dispersion/dispersion slope compensator 32 into two portions and applies one portion to the demultiplexer 36 and the other to an optical selector 90. The optical selector 90 selects the output light from the variable dispersion/dispersion slope compensator 82 or the output light from the divider 88 and applies it to the optical autocorrelator 84. A controller 92 controls the optical selector 90 to apply the output light from the variable dispersion/dispersion slope compensator 82 to the optical autocorrelator 84 while the dispersion compensation by the variable dispersion/dispersion slope compensator 82 and optical autocorrelator 84 are performed on trial. When the trial of the dispersion compensation is completed, the controller 92 then controls the variable dispersion/dispersion slope compensator 32 by controlling the optical selector 90 so as to apply the output light from the optical divider 88, i.e. the output light from the variable dispersion/dispersion slope compensator 32 to the optical autocorrelator 84.

In the embodiment shown in FIG. 8, the individual differences of the variable dispersion/dispersion slope compensators 32 and 82, shown in FIG. 7, can be absorbed. That is, regardless of the trial result of the dispersion control by the variable dispersion/dispersion slope compensator 82, it is possible to control an amount of dispersion compensation for an actually received signal light to optimum. Since the variable dispersion/dispersion slope compensator 32 is controlled according to the trial (performance) result by the variable dispersion/dispersion slope compensator 82, it is not necessary to largely vary an amount of dispersion compensation for the dispersion control by the variable dispersion/dispersion slope compensator 32 and therefore receiving characteristics do not vary in unnecessarily large amount.

In the above explanatory embodiments, although the amount of dispersion compensation is controlled relative to the autocorrelation and the dispersion slope is controlled relative to the BER, the amount of dispersion compensation can be controlled relative to both of the autocorrelation and BER. In addition, the control of the dispersion slope can be omitted if it is unnecessary. In this sense, the control of the dispersion compensation includes the control of the dispersion slope in the broad sense and does not include the control of the dispersion slope in the narrow sense.

It is applicable to use a Q value of the optical transmission line 20 instead of the BER. Both BER and Q value can be used as transmission error rate information of an optical transmission line.

For control of dispersion compensation relative to the autocorrelation, different methods can be used so that the control is launched at predetermined intervals. For example, the control may be launched when an autocorrelation value becomes lower than a predetermined value, or an amount of dispersion compensation (and dispersion slope) may be regularly controlled so that the autocorrelation becomes maximum. The control of dispersion compensation relative to the BER is not limited to after the performance of dispersion compensation control relative to the autocorrelation and can be performed independently of the dispersion compensation control relative to autocorrelation. However, it is more efficient to perform the dispersion compensation control relative to the BER after performing the dispersion compensation control relative to the autocorrelation.

As readily understandable from the aforementioned explanation, according to the invention, it is possible to properly control accumulated chromatic dispersion and realize satisfactory transmission characteristics in an extremely high speed optical fiber transmission.

While the invention has been described with reference to the specific embodiment, it will be apparent to those skilled in the art that various changes and modifications can be made to the specific embodiment without departing from the spirit and scope of the invention as defined in the claims.

The invention claimed is:

1. An optical receiver comprising:
   an optical divider to divide a signal light from an optical transmission line into two portions;
   a first and a second dispersion compensators, each dispersion compensator having variable dispersion compensation to compensate chromatic dispersions of each of the two portions of signal light output from the optical divider;
   a data demodulator to demodulate a data carried by a signal light output from the first dispersion compensator;
   an optical autocorrelator to operate on a signal light output from the second dispersion compensator; and
   a controller to control the second dispersion compensator to increase autocorrelation of the optical autocorrelator, and to control the first dispersion compensator according to the result of said controlling the second dispersion compensator.

2. The optical receiver of claim 1 wherein the data demodulator comprises a transmission error rate information calculator to calculate information indicating a transmission error rate of the optical transmission line; and wherein the controller controls the first dispersion compensator to decrease the transmission error rate according to an output from the transmission error rate information calculator.

3. The optical receiver of claim 2 wherein the first dispersion compensator comprises a dispersion/dispersion slope compensator having variable dispersion compensation and variable dispersion slope; and wherein the controller controls the dispersion slope of the dispersion/dispersion slope compensator to decrease the transmission error rate.

4. An optical receiver comprising:
   a first optical divider to divide a signal light input from an optical transmission line into two portions;
   a first and a second dispersion compensators, each dispersion compensator having variable dispersion compensation to compensate chromatic dispersion of each portion of signal light output from the first optical divider;
   a second optical divider to divide an output light from the first dispersion compensator into two portions;
   a data demodulator to demodulate a data carried by a first portion of signal light output from the second optical divider;
   an optical autocorrelator;
   an optical selector to select an output light from the second dispersion compensator, or a second portion of output light from the second optical divider, and to supply the selected output light to the optical autocorrelator; and
   a controller to control the second dispersion compensator to increase autocorrelation of the optical autocorrelator when the optical selector is controlled to supply the output signal light from the second dispersion compensator to the optical autocorrelator, and to control the first dispersion compensator according to the result of the control of the second dispersion compensator.

5. The optical receiver of claim 4 wherein the controller controls the first dispersion compensator to increase autocorrelation of the optical autocorrelator when the optical selector is controlled to supply an output signal light from the first dispersion compensator to the optical autocorrelator.

6. The optical receiver of claim 4 wherein
   the data demodulator comprises a transmission error rate information calculator to calculate information indicating a transmission error rate of the optical transmission line; and wherein
   the controller controls the first dispersion compensator to decrease the transmission error rate according to an output from the transmission error rate information calculator.

7. The optical receiver of claim 6 wherein
   the first dispersion compensator comprises a dispersion/dispersion slope compensator having variable dispersion compensation and variable dispersion slope; and wherein
   the controller controls the dispersion/dispersion slope compensator to decrease the transmission error rate.

8. A method for controlling a first dispersion compensator to compensate chromatic dispersion of a first portion of a signal light input from an optical transmission line, the method comprising:
   dividing the signal light input into the first portion and a second portion;
   providing a second dispersion compensator having variable dispersion compensation to compensate chromatic dispersion of the second portion of the signal light input from the optical transmission line;
   operating autocorrelation by an optical autocorrelator on a signal light output from the second dispersion compensator;
   controlling the second dispersion compensator to increase autocorrelation of the optical autocorrelator; and
   controlling the first dispersion compensator according to the result from said controlling the second dispersion compensator.

9. The method of claim 8 further comprising calculating information indicating a transmission error rate of the optical transmission line out of a signal light output from the first dispersion compensator; and
   controlling the first dispersion compensator to decrease transmission error rate.

10. The method of claim 9 wherein the first dispersion compensator comprises a dispersion/dispersion slope compensator having variable dispersion compensation and variable dispersion slope; and wherein
    the controlling controls the dispersion slope of the dispersion/dispersion slope compensator to decrease the transmission error rate.

11. The method of claim 8 further comprising operating autocorrelation of an output signal light from the first dispersion compensator after controlling the first dispersion compensator to increase the autocorrelation.

12. The method of claim 8 wherein the first dispersion compensator comprises a dispersion/dispersion slope compensator having variable dispersion compensation and variable dispersion slope; and further comprising controlling the dispersion slope of the dispersion/dispersion slope compensator to decrease the transmission error rate.

* * * * *